(12) United States Patent
Church et al.

(10) Patent No.: US 6,659,088 B2
(45) Date of Patent: Dec. 9, 2003

(54) USE OF SINGLET DELTA OXYGEN TO ENHANCE THE PERFORMANCE OF INTERNAL COMBUSTION ENGINES, DIESEL ENGINES IN PARTICULAR

(75) Inventors: Charles H. Church, Savannah, GA (US); Frederick G. Smith, Ann Arbor, MI (US); Dennis N. Assanis, Ann Arbor, MI (US)

(73) Assignee: OptiMetrics, Inc., Ann Arbor, MI (US)

( * ) Notice: Subject to any disclaimer, the term of this patent is extended or adjusted under 35 U.S.C. 154(b) by 0 days.

(21) Appl. No.: 10/277,335

(22) Filed: Oct. 22, 2002

(65) Prior Publication Data

US 2003/0094163 A1 May 22, 2003

Related U.S. Application Data

(60) Provisional application No. 60/337,488, filed on Oct. 22, 2001.

(51) Int. Cl.[7] ............................................. F02M 33/00
(52) U.S. Cl. ....................................................... 123/536
(58) Field of Search ................................. 123/536, 537, 123/530, 539

(56) References Cited

U.S. PATENT DOCUMENTS 4,342,116 A * 7/1982 MacKnight et al. ........ 423/579
6,165,424 A * 12/2000 Clendening, Jr. et al. ... 422/235

OTHER PUBLICATIONS

"Initiation of combustion and detonation by laser induced electronical excitation of $O_2$ molecules to the $a^1\Delta_g$ and $b^1\Sigma_g^+$ states," Starik, Alexander M., Titova, Nataliya S., Central Institute of Aviation Motors (Moscow, Russia), presented at SPIE High Power Laser Aviation 2002 Conference, Taos, NM, Apr. 21, 2002.

* cited by examiner

Primary Examiner—Marguerite McMahon
(74) Attorney, Agent, or Firm—Gifford, Krass, Groh, Sprinkle, Anderson & Citkowski, PC

(57) ABSTRACT

The singlet delta energy levels of molecular oxygen (SDO) are generated to enhance the performance of internal-combustion engines, diesel engines in particular. In the preferred embodiments, this control takes place just prior to, and in the initial stages of, fuel injection. The SDO can be generated using different methods according to the invention, including thermal means, optical/laser energy, electrical/electromagnetic excitation, or a combination of these approaches. SDO may also be generated through reactions of a chemical fuel additive or a laser-excited chemical additive. A system for improving the performance of an internal combustion engine according to the invention includes a source or energy operative to generate singlet delta oxygen (SDO) from molecular oxygen, and apparatus for mixing the SDO with fuel prior to, or during, combustion. In the preferred embodiment, the SDO is delivered with air through an air-intake port, and a laser is used in a multi-pass absorption cell.

19 Claims, 2 Drawing Sheets

USE OF SINGLET DELTA OXYGEN TO ENHANCE THE PERFORMANCE OF INTERNAL COMBUSTION ENGINES, DIESEL ENGINES IN PARTICULAR

REFERENCE TO RELATED APPLICATION

This application claims priority to U.S. Provisional Patent Application Serial No. 60/337,488, filed Oct. 22, 2001, the entire content of which is incorporated herein by reference.

BACKGROUND OF THE INVENTION

Unlike most natural compounds, molecular oxygen in its $^3\Sigma_g^-$ ground state has triplet multiplicity but not singlet multiplicity. The lowest excited singlet state of $O_2$, the $^1\Delta_g$ state, is a metastable species. Being 94 kJ $mol^{-1}$ above the triplet ground state, $O_2(^1\Delta g)$ singlet delta oxygen (SDO) is extremely chemically reactive, finding application in bleaching, disinfection and chemical processes. Predictions and experiments have demonstrated that SDO can be generated through laser or electrical excitation of ground state oxygen.

The internal-combustion engine-powered motor vehicle industry represents a market of over $1 trillion per year. There are major health-related issues that are leading to much more stringent regulations on the exhaust and noise emissions of these engines. Present technology falls short of achieving higher power densities with greater efficiencies and reduced exhaust emissions. The harshness (NVH) of current engines limits many applications, particularly in light duty cycles, where the engines operates much of the time at idle and low load.

It is believed that SDO may play an important role in low-temperature combustion. Diesel engine experiments and modeling have demonstrated that engine performance can be enhanced by heating the inlet air. Since heating the air is one way to increase SDO, this is indirect evidence of SDO's benefits. Fuel additives that chemically produce SDO are also observed to improve diesel engine performance. Chemical kinetics modeling has shown that SDO generation by temperature may explain some of the otherwise unexplained phenomena observed in diesel engines (e.g., temperatures required for ignition, observed ignition time delays). Although SDO radiation is observed from combustion processes, the precise role of the SDO contribution is not well understood.

SUMMARY OF THE INVENTION

This invention broadly seeks to control the singlet delta energy levels of molecular oxygen (SDO) intake to enhance the performance of internal-combustion engines, diesel engines in particular. In the preferred embodiments, this control takes place just prior to, and in the initial stages of, fuel injection.

The SDO can be generated using different methods according to the invention, including thermal means, optical/laser energy, electrical/electromagnetic excitation, or a combination of these approaches. SDO may also be generated through reactions of a chemical fuel additive or a laser-excited chemical additive.

A system for improving the performance of an internal combustion engine according to the invention includes a source or energy operative to generate singlet delta oxygen (SDO) from molecular oxygen, and apparatus for mixing the SDO with fuel prior to, or during, combustion. In the preferred embodiment, the SDO is delivered with air through an air-intake port, and a laser is used in a multi-pass absorption cell.

DETAILED DESCRIPTION OF THE INVENTION

Figure 1:
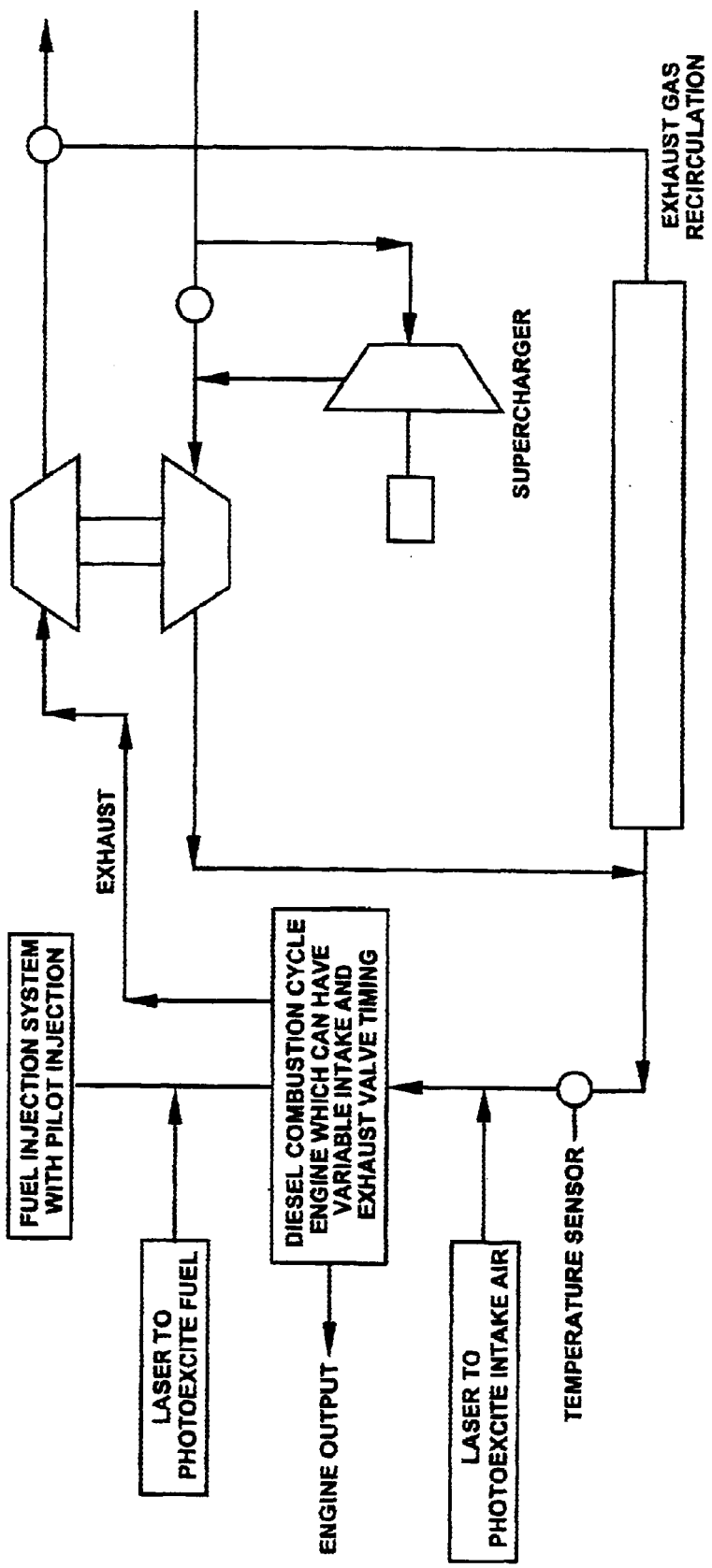
FIG. 1 is a block diagram of an engine system constructed in accordance with this invention.

This invention uses a novel combination of techniques and devices to control the singlet delta energy levels of molecular oxygen (SDO) to enhance the performance of diesel combustion engines. In the preferred embodiments, this control takes place just prior to, and in the initial stages of, fuel injection.

The SDO can be generated using different methods according to the invention, including by thermal means, laser energy, electrical excitation, or a combination of these approaches. SDO may also be generated through reactions of a chemical fuel additive or a laser-excited chemical additive.

The thermal means may include heating of the charge air by pilot or multistage fuel injection, and may involve techniques to add and retain heat in the combustion chamber. Laser or electrical excitation of the oxygen for SDO can be done in the charge air (in the intake manifold or in the combustion chamber) or in the fuel with an additive which releases SDO upon photoexcitation into the combustion chamber concurrent with the injected fuel.

For thermally generated SDO, the temperature of the charge air is preferably controlled to a degree sufficient to populate the singlet delta energy levels of the molecular oxygen in the charge air just prior or during the injection of the fuel into the combustion chamber. This temperature control can be a combination of several techniques which include intake air heating, modulated pilot or multistage fuel injection, exhaust gas recirculation or retention, or air compression through supercharging and/or turbocharging.

These thermal control techniques are necessary during engine operation at idle and low load of engines with low mechanical compression ratios (i.e., mechanical compression ratios of 12:1 or less). At higher loads, where the charge air is normally heated, cooler air may be provided after the initiation of combustion to increase charge air density. In the case of thermally generated SDO, the invention takes advantage of modeling equations that represent the thermal generation of SDO, the effects of SDO on combustion, and in combination with other engine performance models, allowing for the optimization of engine designs.

In a laser-aided or electrically activated embodiment of the invention, the excitation would be of the charge air and/or fuel just prior or during the injection of the fuel into the combustion chamber. To realize this mode of operation, the laser may radiate in an absorption band that excites, either directly or indirectly, the singlet delta levels of molecular oxygen. This process would provide controlled combustion through the generation of the singlet delta excited state of molecular oxygen for combustion with the hydrocarbon fuels. A controlled electrical discharge can also be used to create SDO in the inlet air stream.

Chemical additives may be used in accordance with the invention to release SDO during the injection process. As an alternative, the additive would release SDO when activated by laser irradiation.

FIG. 1 is a block diagram of an engine system to which the invention is applicable. The major control parameter is the singlet delta excitation level of the molecular oxygen in the charge air just prior and immediately following the initiation of fuel injection. FIG. 1 illustrates the engine factors that can impact this level. Parameters that can be monitored include the dimol emission at 0.62 microns, the noise, vibration, and harshness level, the exhaust emissions, and the charge air temperature.

Figure 2:
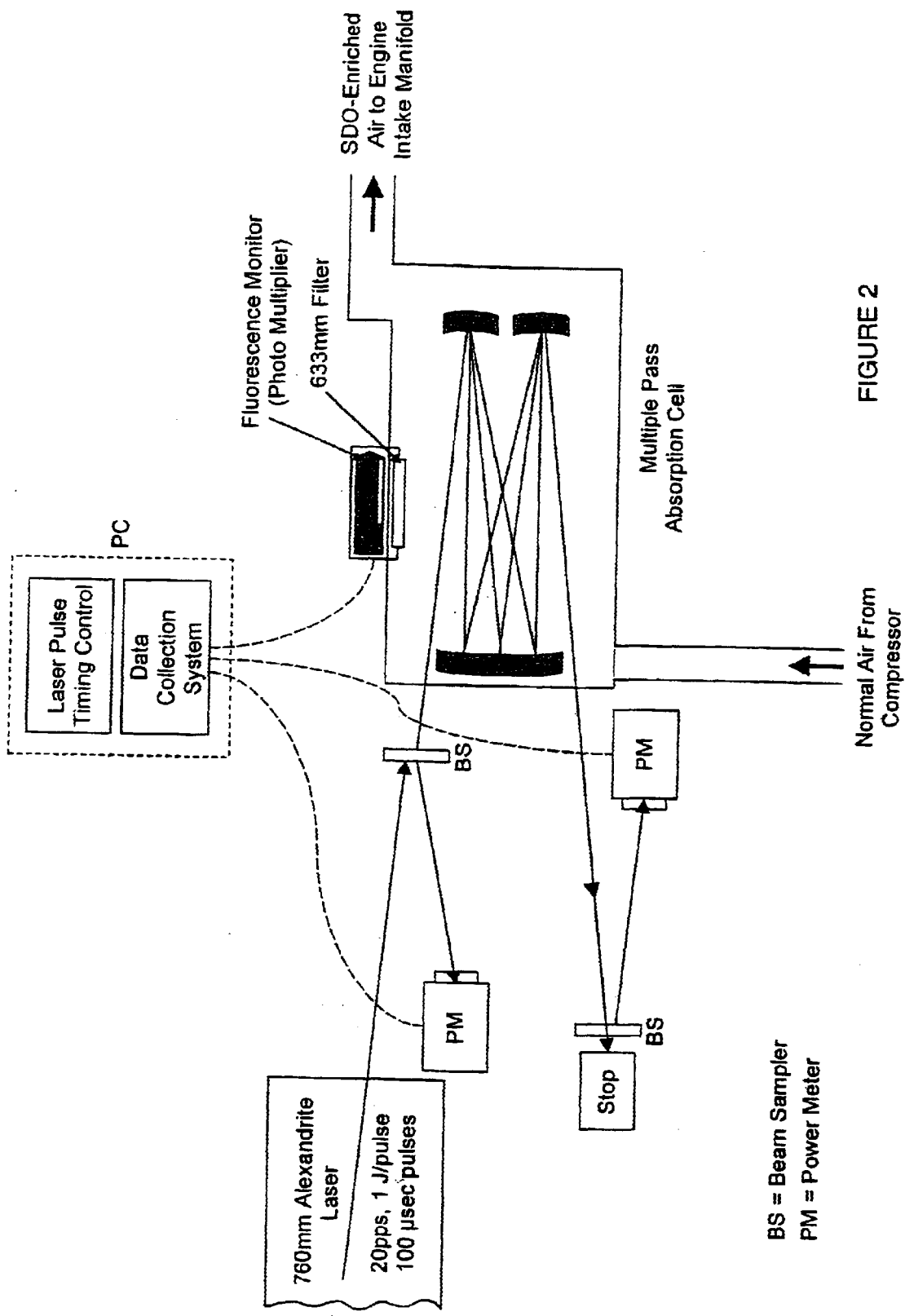
FIG. 2 shows an optical arrangement to generate SDO using a tunable laser and a multi-pass absorption cell.

The laser excitation may be in the charge air or in the fuel containing a photosensitive additive seeking to use the least amount of laser power possible to allow use of semiconductor laser arrays for the laser excitation. FIG. 2 shows an optical arrangement to generate SDO using a tunable laser. Overall, the goal is to achieve the simplest lowest total cost system for the goals of engine operation. The combination of the above factors are optimized for output power required, life cycle costs, initial costs, propulsion system size, and weight, and the level of the legislated emissions.

The strategy to apply this invention would be dependent upon the technology level and the constraints imposed of the engine under consideration that can range from modifications to an existing engine to an entirely new engine design. The diesel combustion cycle engines can be 4-stroke cycle, 2-stroke cycle, or less conventional approaches such as the Wankel or scroll cycles, and over a range of sizes ranging from very small systems (less than a cubic foot in volume) to the cathedral diesels used in merchant ships.

For existing engines, potential external changes to the engine would include simple two-stage pilot injection, variable-speed supercharging, variable-geometry turbocharging, intake air heating, exhaust-gas retention or recirculation, and laser excitation of the intake air or input fuel. Internal changes applied to an existing engine or a new design could include reducing the mechanical compression ratio, and variable intake and exhaust valve timing.

Other, more radical internal changes to the engine may include changes in the piston design and in dynamic balancing for increased range of engine operating speeds to both higher speeds for more power and lower speeds for reduced idle and low load fuel consumption. For engine designs made practical with SDO control, the 2-stroke cycle and Wankel-cycle offer much promise for higher power density, greater fuel economy, and lower emissions.

Application of the technique enables engine designers to reduce mechanical compression ratios and extend operating speed ranges, both to lower speeds for reducing idle fuel consumption and to higher engine speeds for greater output powers and higher power densities.

Engines designed according to the principles of this invention should operate over an extended range of conditions where conventional engines cannot operate or operate with low efficiency. The control of SDO allows engine designs that can have higher peak power densities in part due to the low mechanical compression ratios (and thus higher power output for the same peak chamber pressure) and to the higher engine speeds at which they can be operated. The reduced particulate emissions result from the higher air/fuel ratios and enhanced combustion. The higher cycle efficiencies arise from the reduced idle speeds the smoother combustion allows. The reduced emissions of oxides of nitrogen arise from the more uniform, lower-peak temperatures in the combustion chamber.

This invention removes the hitherto regarded small volume and high speed limitations of diesel combustion engines, enabling very small combustion volume very high power density diesel engines to be made for applications such as unmanned systems, robotics, or very small volume motor/generator sets.

The improved operation made possible by the invention can lead to engine systems with much higher fuel efficiencies over typical duty cycles. The invention is applicable to all types of internal combustion engines, including passenger cars and trucks, marine vehicles, combat vehicles, and aerial vehicles. The applications also include engines associated with the generation of electric power over the entire ranges of power rating from subkilowatt to many megawatts.

Control of the singlet delta oxygen (SDO) can also be applied to gas turbine engines and any other combustion process involving the reaction of oxygen with hydrocarbon fuels. Applied to diesel combustion engines, the control would reduce the emissions of particulates while increasing the capability of the engine to operate at very high power densities. The control would facilitate design of low compression ratio and very high-speed diesel combustion engines. Engines operating in this mode could be highly efficient, easy to start and run in cold weather, and exhibit low exhaust emissions at idle and low part load, the regime of operation for passenger cars, light and medium trucks, the majority of combat vehicles, and many motor/ generator sets.

The major fields of application in the near term are in passenger cars and light trucks in the United States of America where the current technology is the spark ignition engines with three-way catalytic converter exhaust gas emission treatment. The fuel economy improvement with similar performance over the light duty driving cycle could be a factor of two or more.

Another field of application is in combat vehicles that utilize military applications of commercial engines; combat vehicles do not have to meet emission regulations, but many of the vehicles have commercially based engines that are no longer in commercial production. The availability of low cost diesel combustion engines and parts would open a wholly new market in total energy systems for homes and small businesses where the waste heat is used for heating and cooling.

When applied in a production environment, the approach can reduce exhaust emissions, noise, vibration, and harshness (NVH); improve cold weather starting and running; allow the use of a wider range of hydrocarbon fuels including gasoline and natural gas; and allow major increases in power density.

We claim:

1. A method of improving the performance of an internal combustion engine, comprising the steps of:
   generating singlet delta oxygen (SDO) from molecular oxygen; and
   mixing the SDO with fuel prior to, or during, combustion.
2. The method of claim 1, wherein:
   the engine is fuel-injected; and
   the SDO is delivered in the initial stages of fuel injection.
3. The method of claim 1, wherein:
   the engine is fuel-injected; and
   the SDO is delivered during the fuel injection.
4. The method of claim 1, further including the step of generating the SDO within the combustion chamber.
5. The method of claim 1, wherein the engine is a diesel engine.
6. The method of claim 1, wherein the SDO is generated using thermal energy.

7. The method of claim 1, wherein the SDO is generated using optical energy.

8. The method of claim 1, wherein the SDO is generated using electromagnetic energy.

9. The method of claim 1, wherein the SDO is chemically generated.

10. A system for improving the performance of an internal combustion engine, comprising:

a source or energy operative to generate singlet delta oxygen (SDO) from molecular oxygen; and apparatus for mixing the SDO with fuel prior to, or during, combustion.

11. The system of claim 10, wherein the SDO is delivered with air through an air-intake port.

12. The system of claim 10, further including a fuel injector.

13. The system of claim 10, wherein the apparatus for mixing the SDO with fuel is contained in the combustion chamber.

14. The system of claim 10, wherein the engine is a diesel engine.

15. The system of claim 10, wherein the source of energy generates thermal energy.

16. The system of claim 10, wherein the source of energy generates optical energy.

17. The system of claim 10, wherein the source of optical energy is a laser.

18. The system of claim 10, wherein the source of energy generates electromagnetic energy.

19. The system of claim 10, wherein the SDO is chemically generated.

* * * * *